(12) United States Patent
Manwaring et al.

(10) Patent No.: US 7,640,824 B2
(45) Date of Patent: Jan. 5, 2010

(54) CENTRAL LOCK DEVICE OF AN ADJUSTABLE STEERING COLUMN ASSEMBLY

(75) Inventors: Marvin V. Manwaring, Clio, MI (US); Ravi Ravindra, Saginaw, MI (US); Amelia M. Lask, Bay City, MI (US); Melvin L. Tinnin, Clio, MI (US); Richard P. Nash, Frankenmuth, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 200 days.

(21) Appl. No.: 11/803,525

(22) Filed: May 15, 2007

(65) Prior Publication Data

US 2008/0060467 A1 Mar. 13, 2008

Related U.S. Application Data

(60) Provisional application No. 60/844,283, filed on Sep. 13, 2006.

(51) Int. Cl.
*B62D 1/18* (2006.01)
(52) U.S. Cl. .......................................... 74/493; 74/492
(58) Field of Classification Search ................... 74/492, 74/493; 280/775, 777
See application file for complete search history.

(56) References Cited

U.S. PATENT DOCUMENTS

| 4,472,982 | A | 9/1984 | Nishikawa |
| 4,793,204 | A | 12/1988 | Kubasiak |
| 5,588,337 | A | 12/1996 | Milton |
| 5,722,299 | A * | 3/1998 | Yamamoto et al. ............ 74/493 |
| 6,237,439 | B1 | 5/2001 | Weber et al. |
| 6,481,310 | B2 | 11/2002 | Janeczko et al. |
| 6,540,429 | B2 | 4/2003 | Weisgerber et al. |
| 6,616,185 | B2 | 9/2003 | Manwaring et al. |
| 6,659,504 | B2 | 12/2003 | Riefe et al. |
| 6,695,350 | B2 | 2/2004 | Uphaus et al. |
| 6,729,007 | B2 | 5/2004 | Weisberger et al. |
| 6,857,660 | B2 | 2/2005 | Manwaring et al. |
| 6,863,306 | B2 | 3/2005 | Bechtel et al. |
| 7,055,860 | B2 * | 6/2006 | Armstrong et al. .......... 280/775 |
| 7,093,855 | B2 * | 8/2006 | Manwaring et al. ......... 280/775 |
| 7,281,448 | B2 * | 10/2007 | Li et al. ........................ 74/493 |
| 7,331,608 | B2 * | 2/2008 | Armstrong et al. .......... 280/775 |

* cited by examiner

*Primary Examiner*—David M Fenstermacher
(74) *Attorney, Agent, or Firm*—Cantor Colburn LLP

(57) ABSTRACT

An adjustable steering column assembly of a vehicle has a central lock device for selectably locking an adjustable steering housing and co-extending steering shaft to a stationary bracket or chassis. For driver convenience and comfort, the steering housing and shaft are together adjustable with respect to the bracket. The lock device has a roller actuator preferably having inner outer members with a lever supported operably in between by a guide feature for movement along a first centerline substantially parallel to the steering shaft. Preferably, cam couplers are located between the outer member and the lever and the inner member and the lever for converting movement of the lever along the centerline to longitudinal movement of a carrier that traverses the centerline.

20 Claims, 12 Drawing Sheets

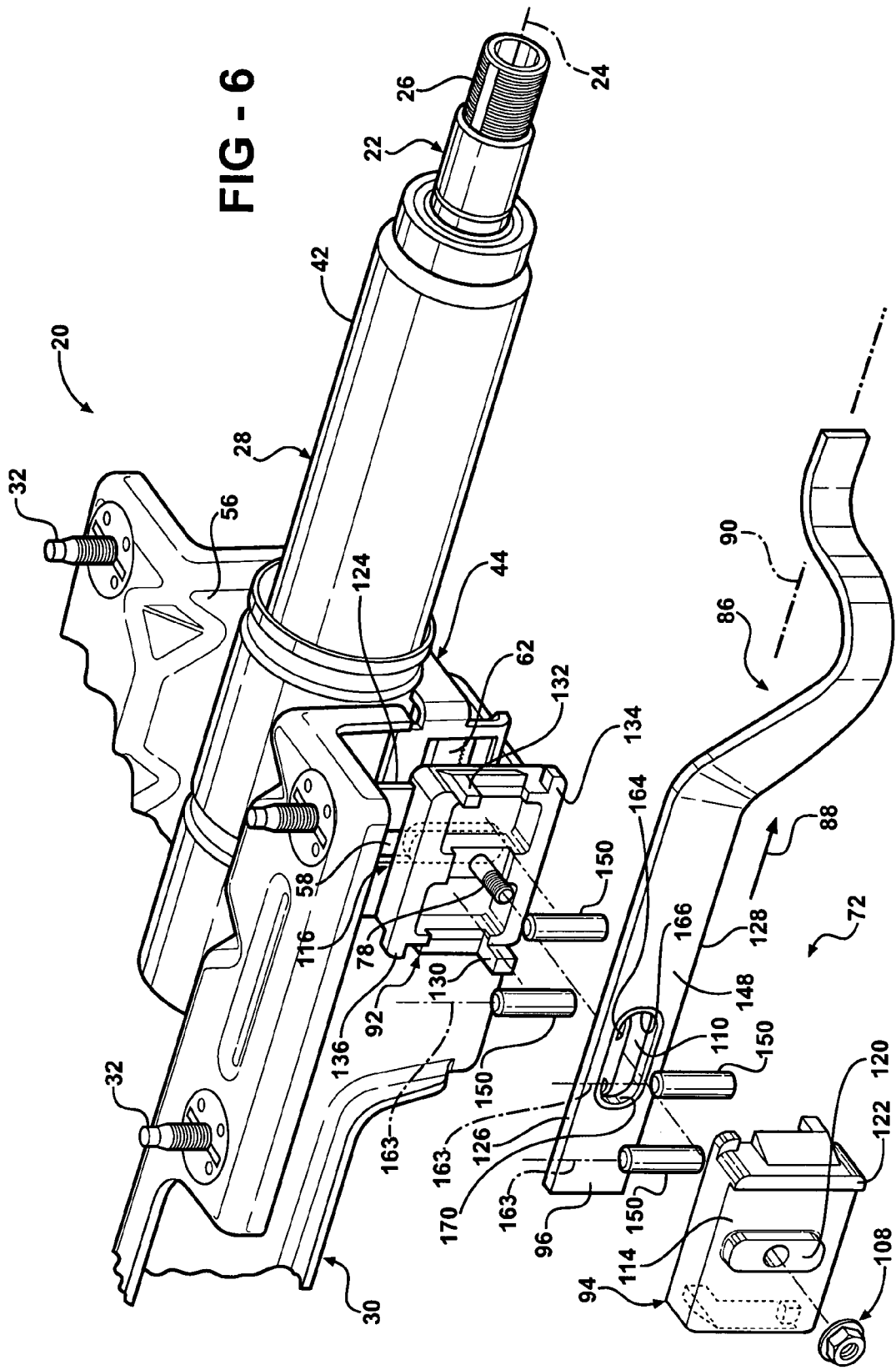

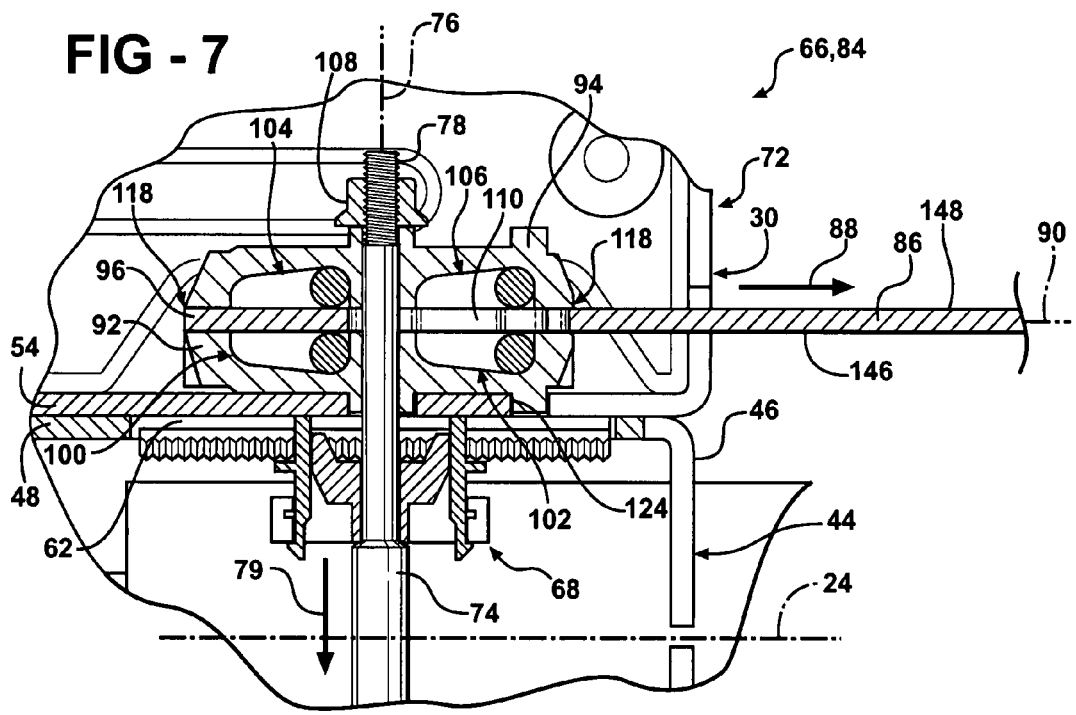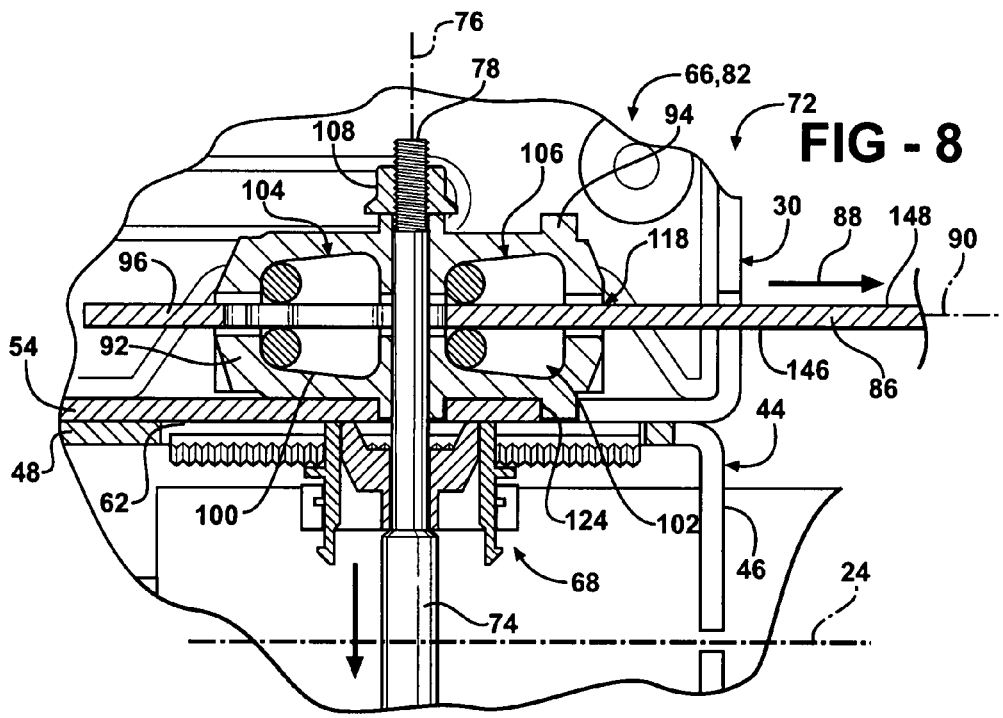

CENTRAL LOCK DEVICE OF AN ADJUSTABLE STEERING COLUMN ASSEMBLY

RELATED APPLICATIONS

This application claims priority of U.S. Provisional Patent Application Ser. No. 60/844,283 filed Sep. 13, 2006, which is incorporated herein by reference.

FIELD OF THE INVENTION

The present invention relates to an adjustable steering column assembly for a vehicle, and more particularly to a central lock device of the adjustable steering column assembly having a roller actuator.

BACKGROUND OF THE INVENTION

Known adjustable steering column assemblies can be adjusted in a longitudinal or telescoping direction and in a tilt direction. Generally the longitudinal direction moves a steering wheel forward and rearward with respect to the vehicle and thus farther or closer to the driver. The tilt direction generally moves and tilts the steering in a vertical direction, thus closer or further away from a lap of the driver. To adjust the steering column assembly, the driver must first unlock a lock device before the steering column assembly will move. In some known assemblies, the tilt adjustment and the telescoping adjustment features each have their own lock device. In other known assemblies, a single lock device will release the assembly for both adjustments.

Unfortunately, the actuating levers of known lock devices are typically orientated on either the left or right hand sides of the steering column and actuated via a pivoting movement. This orientation and the required pivoting action limit packaging ability of the assembly and can restrict comfort and convenience for the driver. Moreover, known levers are typically mounted to a stationary bracket of the assembly thus do not move with respect to the steering wheel. Thus and in reference to the steering wheel, the position of the lever changes and may not be ideally positioned through the adjustment range of the assembly.

SUMMARY OF THE INVENTION

An adjustable steering column assembly of a vehicle has a central lock device for selectably locking an adjustable steering housing and co-extending steering shaft to a stationary bracket or chassis. For driver convenience and comfort, the steering housing and shaft are together adjustable with respect to the bracket. The lock device has a roller actuator preferably having inner and outer members with a lever supported operably in between by a guide feature for movement along a first centerline substantially parallel to the steering shaft. Preferably, cam couplers are located between the outer member and the lever and the inner member and the lever for converting movement of the lever along the centerline to longitudinal movement of a carrier that traverses the centerline.

Preferably, the carrier operates at least one indexing apparatus supported between the carrier and the housing and/or bracket for longitudinal and/or tilt adjustment of the steering column assembly. The indexing apparatuses move between locked and unlocked positions upon the longitudinal motion of the carrier as a result of the push/pull action of the lever.

Each cam coupler may have a rolling pin located in respective resesses of the members for rolling motion against the lever.

Objects, features and advantages of the present invention include an adjustable steering column assembly having a central lock device that enables a central orientation of a push/pull lever of the device. Moreover, because the lever actuates in a direction substantially parallel to the axis of the steering column and the roller apparatus generally moves with the steering wheel, versatility in the overall packaging of the assembly is improved and operating convenience for the driver is enhanced.

DESCRIPTION OF THE DRAWINGS

These and other objects, features and advantages of this invention will be apparent from the following detailed description, appended claims, and accompanying drawings in which:

FIG. 6 is an exploded perspective view of a roller actuator of the central lock device;

FIG. 7 is a partial cross section, taken along line 7-7 of FIG. 5, of the central lock device in an unlocked position;

FIG. 8 is a partial cross section of the central lock device similar in perspective to FIG. 7 except illustrated in a locked position;

DETAILED DESCRIPTION OF THE PREFERRED EMBODIMENTS

Figure 1:
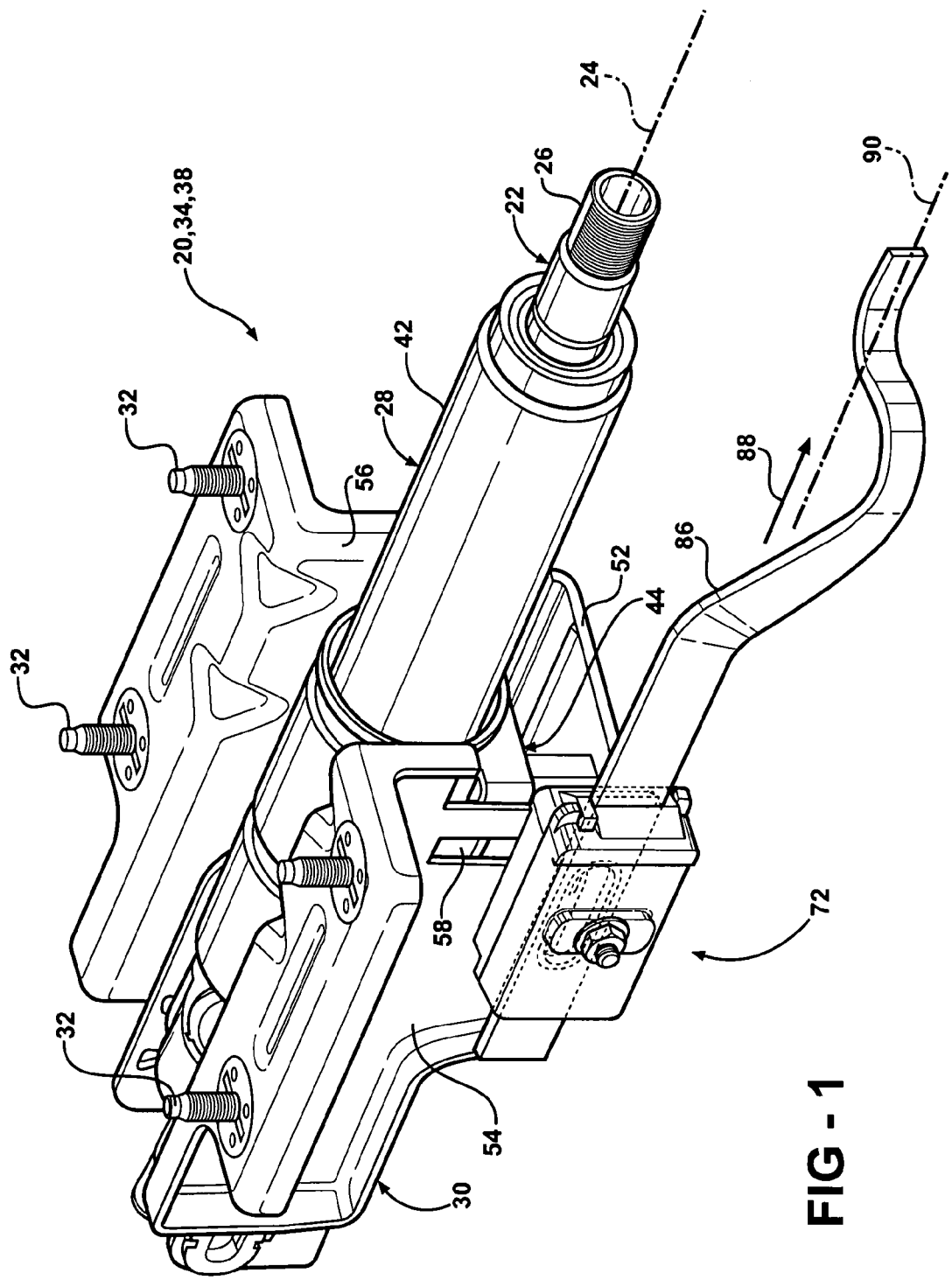
FIG. 1 is a perspective view of an adjustable steering column assembly of the present invention illustrated in a tilt down state and retracted position.

Referring now to FIG. 1 of the drawings, an adjustable steering column assembly 20 for a vehicle has a steering shaft 22 that projects rearward with respect to the vehicle and along a rotation axis 24 to a distal end 26 that attaches to a steering wheel (not shown). The steering shaft 22 is preferably journaled to and rotates within a tilt housing or steering column 28. The housing 28 is supported by a bracket 30 of the assembly 20 that engages rigidly to a chassis of the vehicle via a plurality of pins or threaded studs 32 that project preferably upward from the bracket 30 to engage the chassis. The pins 32 may be constructed and arranged to shear or break away from the chassis should the driver forcibly impact the steering wheel during a vehicle collision.

Figure 2:
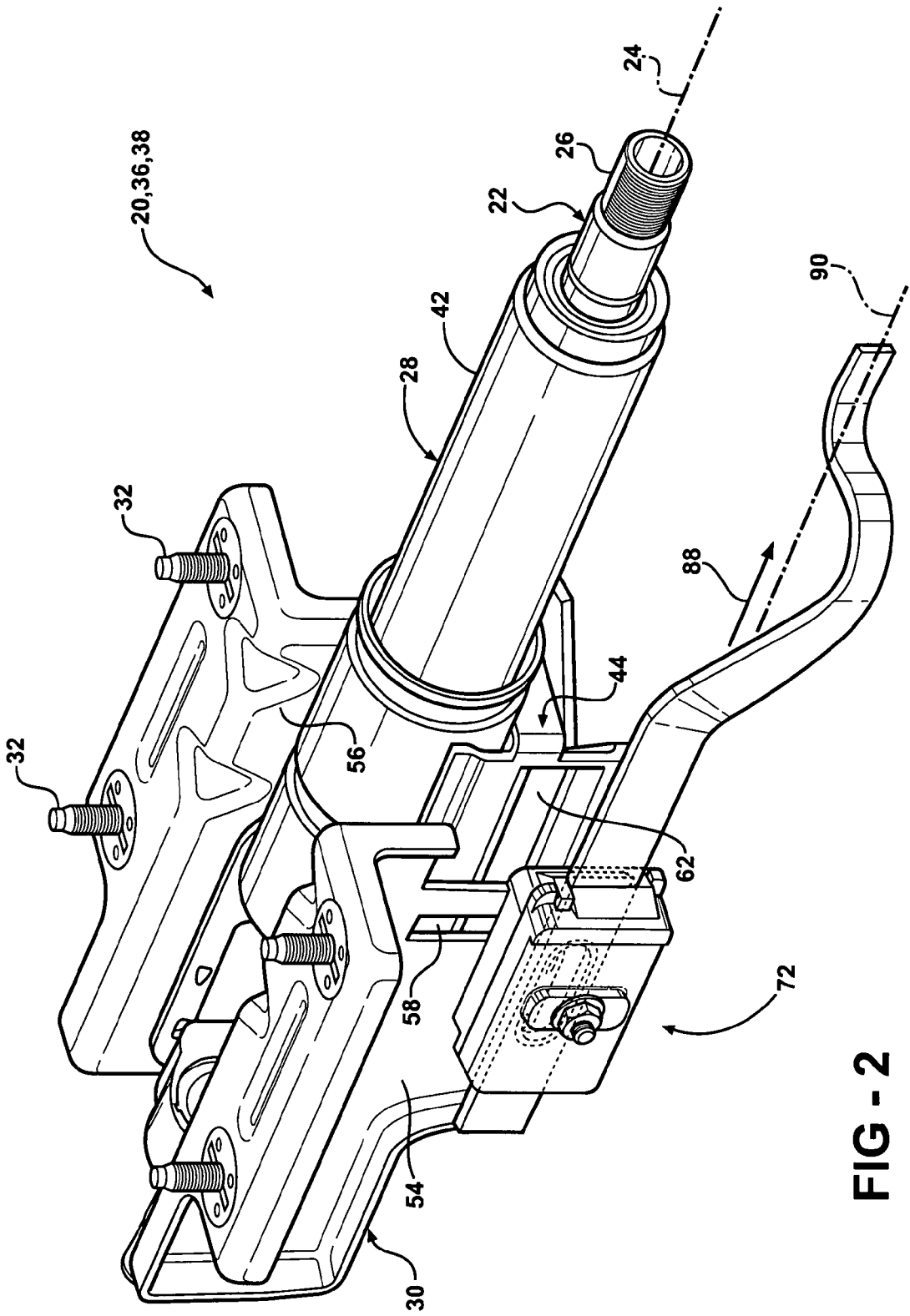
FIG. 2 is a perspective view of the adjustable steering column assembly illustrated in a tilt down state and extended position.

The housing 28 and co-extending shaft 22 are preferably constructed and arranged to extend and retract longitudinally as a single unit and with respect to the bracket 30 between a retracted position 34 (see FIG. 1) and an extended position 36 (see FIG. 2). When extending, the housing 28 and shaft 22 move in a linear rearward direction with respect to the vehicle, and when retracting, the housing 28 and shaft 22 move in a forward direction and generally into the bracket 30.

Figure 3:
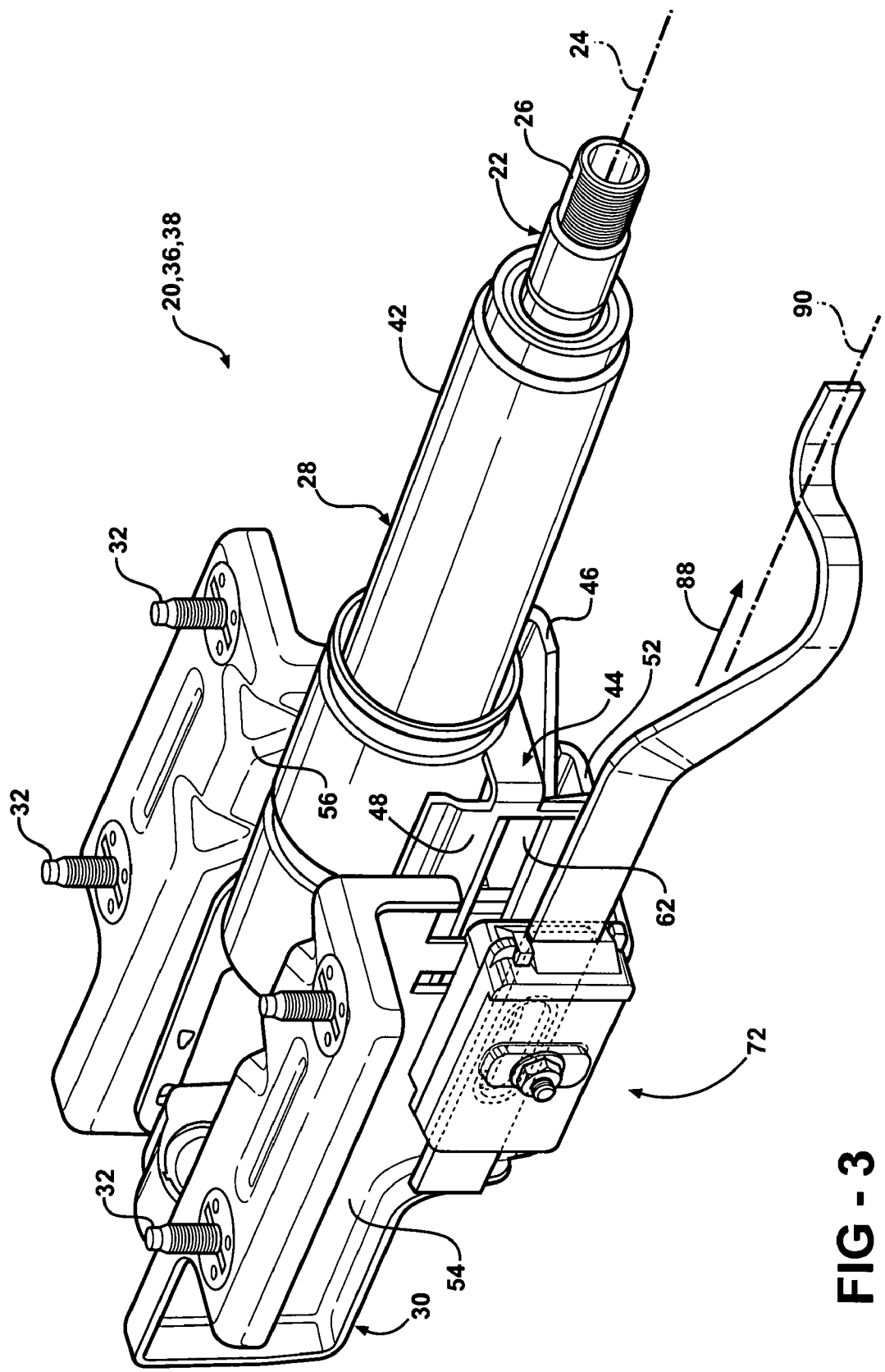
FIG. 3 is a perspective view of the adjustable steering column assembly illustrated in a tilt up state and extended position.

This forward and rearward movement, however, is not necessarily parallel to rotation axis 24 of steering shaft 22 because the housing 28 and shaft 22 are preferably constructed and arranged to tilt as a single unit between a rake or tilt down state 38 (see FIG. 1) and a rake or tilt up state 40 (see FIG. 3). This tilt adjustment moves the distal end 26 of the steering shaft 22 in an arcuate and substantially vertical direction. To accommodate drivers of small stature, the housing 28 is generally extended near the extended position 36 and tilt down state 38. To comfortably accommodate drivers of larger stature, the housing 28 is generally retracted to near the retracted position 34 and the tilt up state 40.

Figure 4:
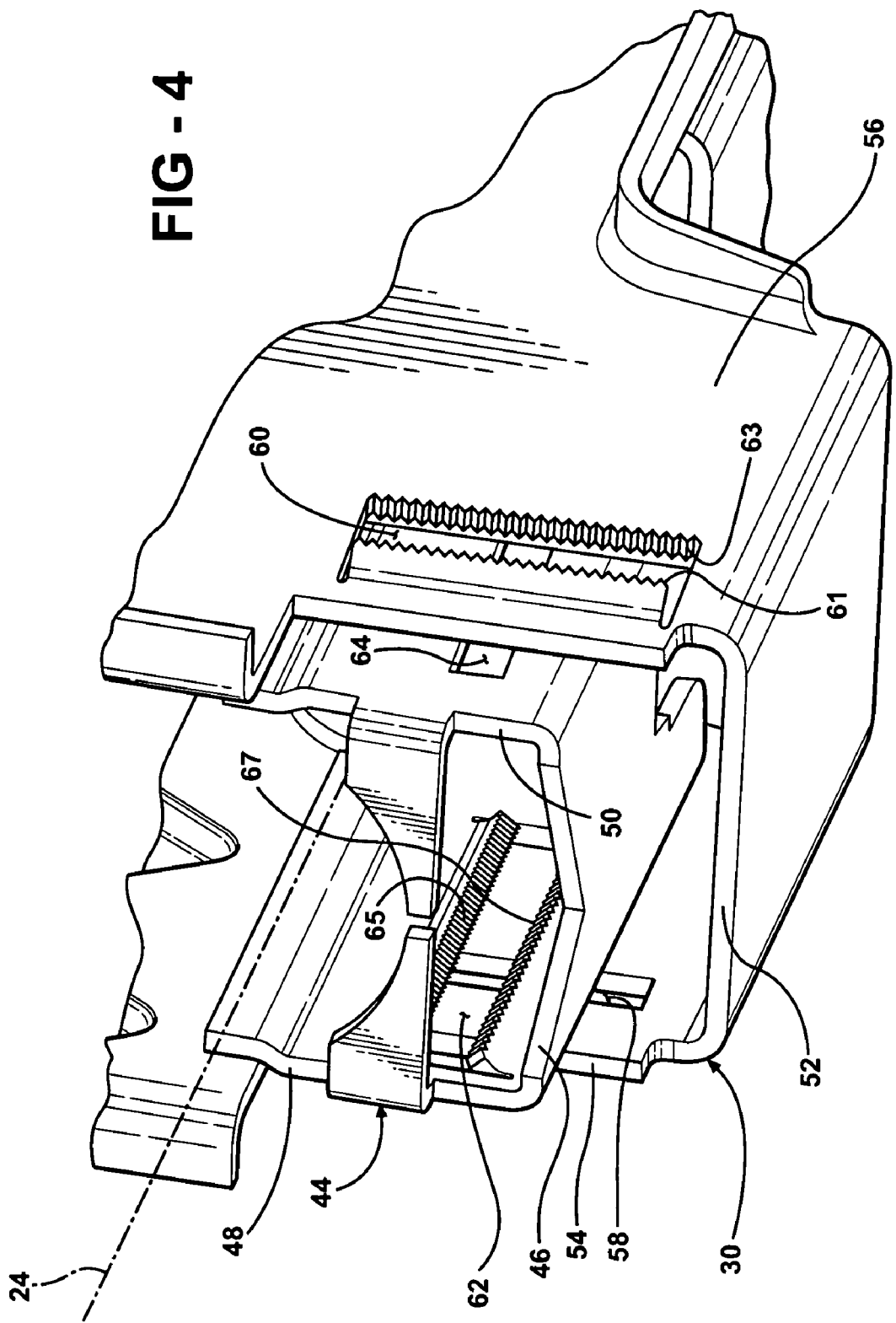
FIG. 4 is a perspective view of a shuttle portion and a bracket of the assembly with other parts removed to show internal detail.
Figure 5:
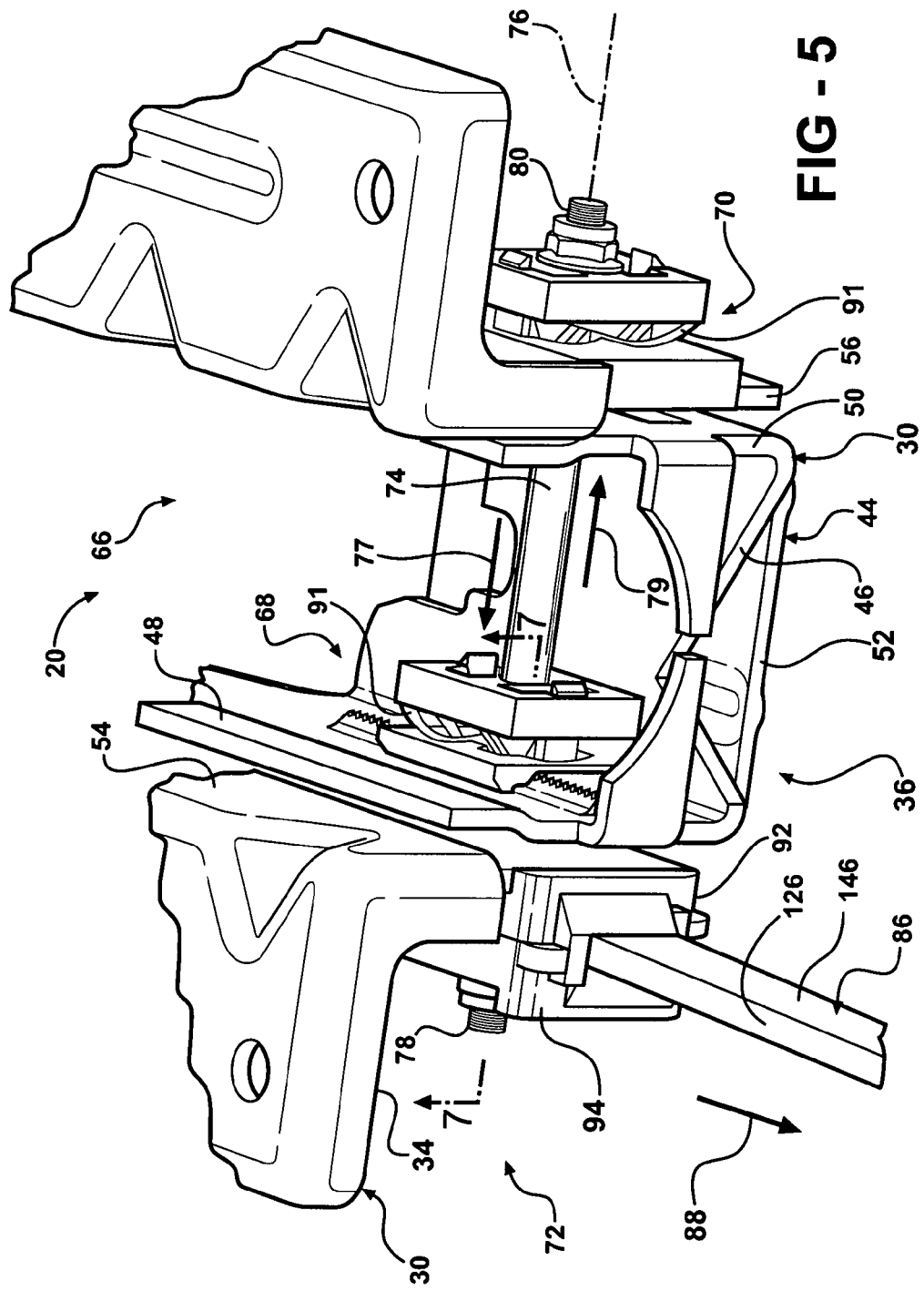
FIG. 5 is a partial perspective view of the steering column assembly illustrating longitudinal and tilt indexing apparatuses of a central lock device of the assembly.

As best illustrated in FIGS. 1 and 4, the housing 28 has a substantially tubular portion 42 that surrounds and rotatably supports the rotating steering shaft 22, and a support shuttle portion 44 that projects downward from the tubular portion 42. The shuttle portion 44 is at least in-part located in the bracket 30 and is supported operably by the bracket. The shuttle portion 44 has a cross section that generally forms an upright U-shape having a bottom wall 46 and two opposite side walls 48, 50 that project upward from the bottom wall 46 to rigidly connect to the tubular portion 42. Correspondingly and as best shown in FIG. 5, the bracket 30 has a bottom panel 52 located immediately beneath the bottom wall 46 of the shuttle portion 44 and two opposite side panels 54, 56 projecting upward from the base panel 52 to preferably engage the vehicle chassis via the pins 32. With respect to axis 24, the side panels 54, 56 are located immediately outward from the respective side walls 48, 50 of the shuttle portion 44. Preferably, the side walls 48, 50 and side panels 54, 56 span substantially vertically and are substantially parallel to one another.

A substantially vertical first slot 58 is located in the first side panel 54 of the bracket 30 and a substantially vertical second slot 60 is located in the second side panel 56 of the bracket 30, both slots 58, 60 enable tilting movement of the housing 28 between the tilt down and tilt up states 38, 40. The second slot 60 is defined by opposing longitudinal sides 61, 63 carried by the side panel 56. Preferably, the first side panel 54 that defines the first slot 58 is generally smooth (i.e. is not indexed), and the second side panel 56 is raked or indexed adjacent to the second slot 60 at opposing sides 61, 63 for selection of a tilt position. For telescoping or longitudinal movement of the assembly 20 between the retracted and extended positions 34, 36, a substantially horizontal third slot 62 is in the first side wall 48 and generally crosses or communicates laterally with the first slot 58, and a substantially horizontal fourth slot 64 is in the second side wall 50 and generally crosses or communicates laterally with the second slot 60. The third slot 62 is defined by opposing longitudinal sides 65, 67 carried by the side wall 48. Preferably, the second side wall 50 that defines the fourth slot 64 is generally smooth (i.e. is not indexed), and the first side wall 48 is indexed adjacent to the third slot 62 and at sides 65, 67 for selection of a longitudinal or extended/retracted position of the assembly 20.

Referring to FIGS. 1, 4 and 5, the assembly 20 has a central lock device 66 that has a first indexing apparatus 68 for adjusting and locking the longitudinal position of the assembly 20, preferably a second indexing apparatus 70 for adjusting and locking the tilt state of the assembly 20, a roller actuator 72, and a linking carrier or rod 74 that operably links both indexing apparatuses 68, 70 to the common actuator 72. The elongated carrier 74 extends through all four slots 58, 62, 64, 60 along a first centerline 76 that is substantially perpendicular to the axis 24 and preferably spaced below the steering shaft 22 and tubular portion 42 of the housing 28. The actuator 72 engages a first end 78 of the carrier 74 located outward from the first side panel 54 of the bracket 30. The carrier 74 generally carries at least in part the first indexing apparatus 68 at a location between the first and second side walls 48, 50 of the shuttle portion 44, and an opposite second end 80 of the carrier 74 connects and carries at least in part the second indexing apparatus 70 at a location outward from the second side panel 56 of the bracket 30.

The indexing apparatuses 68, 70 may be any variety of indexing apparatuses capable of operating with the carrier 74 that moves along the first centerline 76 and in a first direction 77 to place the device 66 in a locked position 82 (see FIG. 8) and in an opposite second direction 79 to place the device 66 in an unlocked position 84 (see FIG. 7). When in the locked position 82, the first end 78 of the carrier 74 is preferably distant from the first side panel 54 of the bracket 30, and when in the unlocked position 84, the first end 78 is closer to or in the proximity of the first side panel 54. One such pair of indexing apparatuses 68, 70 is taught in U.S. patent application Ser. No. 11/726,209 filed Mar. 21, 2007, entitled ROCKER-ARM LOCK DEVICE OF AN ADJUSTABLE STEERING COLUMN ASSEMBLY (U.S. Publication No. 2008-0231030-A1), filed with a common assignee to the present invention and incorporated herein by reference in its entirety.

Referring to FIGS. 1 and 6-8 and more specific to the present invention, in the preferred embodiment of the actuator 72 of the lock device 66, the actuator has an elongated lever 86 that may project in a rearward direction 88 with respect to the vehicle and toward the driver, and generally along a centerline 90. The lever 86 may be manually actuated in a linear direction along its centerline 90 that generally remains substantially parallel to axis 24 regardless of longitudinal positions 34, 36 and regardless of tilt states 38, 40. As noted above, the actuating levers of known lock devices are typically orientated on either the left or right hand sides of the steering column and actuated via a pivoting movement, which limit packaging ability of the assembly and can restrict comfort and convenience for the driver. The rectilinear motion of lever 86 along centerline 90, however, is nonpivoting lever motion. Because movement and projection of the lever 86 is substantially parallel to steering axis 24, the lever 86 is generally central to the assembly 20 as opposed to known levers that project radially with respect to a steering shaft and that generally pivot in an imaginary plane that traverses the steering axis. Manual movement of the lever 86 from the unlocked position 84 and toward the locked position 82 may act against an axial biasing force generally exerted by springs 91 (see FIG. 5) of the indexing apparatuses 68, 70 and with respect to centerline 76 of carrier 74.

Figure 9:
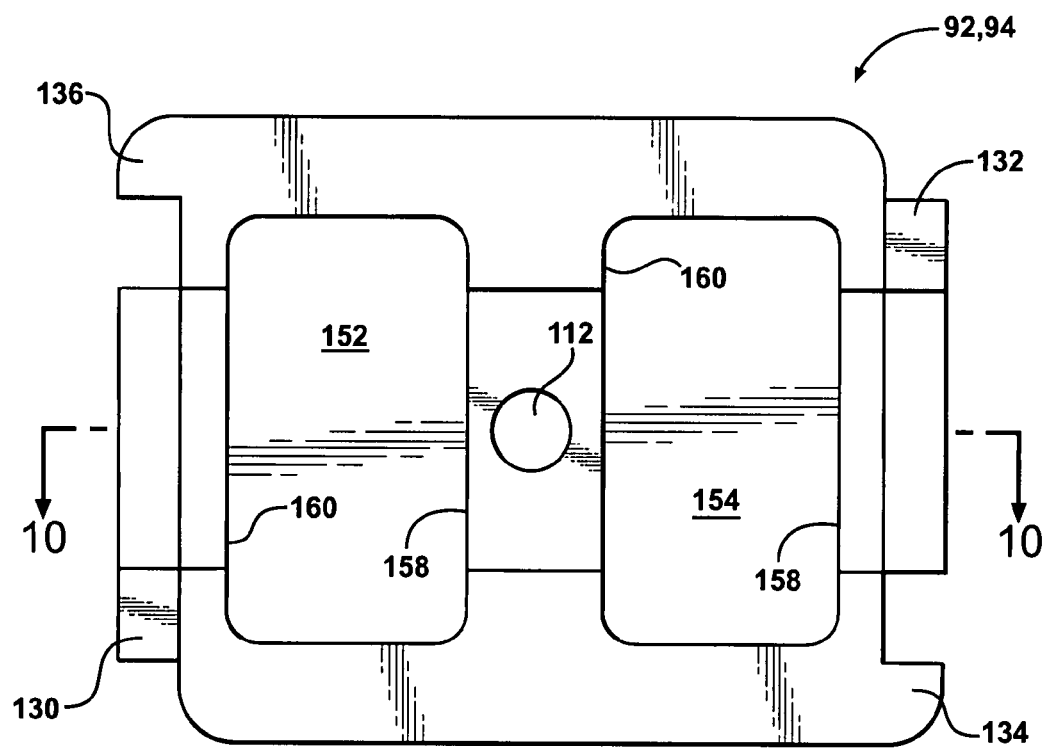
FIG. 9 is a plan view of a cam member of the roller actuator.
Figure 10:
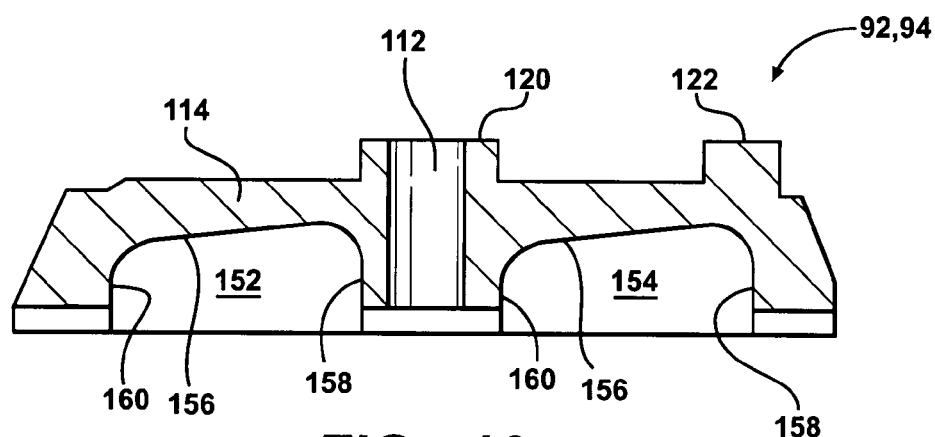
FIG. 10 is a cross section of the cam member taken along line 10-10 of FIG. 9.

Referring to FIGS. 6-8, the actuator 72 diverts or converts motion along the centerline 90 of the lever 86 to motion along the intersecting centerline 76 of the carrier 74. To accomplish this, the actuator 72 has an inner cam member 92 located and preferably supported slidably by the bracket 30, an outer cam member 94 located adjacent to the end 78 of the carrier 74, first and second cam couplers 100, 102 carried between the inner cam member 92 and the end portion 96 of lever 86, and third and fourth cam couplers 104, 106 carried between the outer cam member 94 and the end portion 96. The end 78 of the carrier 74 preferably engages threadably a lock nut 108 that prevents disassembly and maintains proper orientation of the actuator 72. From the enlarged head or nut 108, the carrier 74 projects through a bore 112 (see FIGS. 9 and 10) in the outer cam member 94 and through a slot 110 in the end portion 96 of the lever 86 that extends longitudinally along the centerline 90, and projects through a bore 112 in the inner member 92 before projecting through the slots 58, 62, 64, 60 in the bracket 30 and housing 28 as previously described. The carrier or rod 74 slides axially through the bore 112 in the inner cam member 92 as the carrier 74 moves along centerline 76 between the locked and unlocked positions 82, 84. The close relationship between the inner cam member 92 and the sliding carrier or rod 74 acts generally as a bushing to prevent misalignment of the device 66.

Preferably, the inner and outer cam members 92, 94 are identical for reducing manufacturing costs and simplifying assembly. Both members 92, 94 have a planar base portion or plate 114 disposed substantially perpendicular to centerline 76. The base portion 114 of the inner member 92 generally supports in-part two guide features 116, 118 for multi-directional movement of the actuator 72. As best shown in FIGS. 6-8, guide feature or guide track 116 prevents the inner cam member 92 from moving forward or rearward (i.e. horizontally) with respect to the bracket 30 while preferably guiding the actuator 72 vertically during tilt adjustment of the steering column assembly 20. The guide track 116 is carried between an inner side of the base portion 114 of the inner member 92 and the bracket 30 at the slot 58. Preferably, the guide track 116 has first and second ribs 120, 122 that project contiguously outward from the inner surface of the base portion 114. The first rib 120 projects laterally into the slot 58 in the panel 54 of the bracket 30, and the second rib 122 projects laterally in front of and against a rearward facing edge 124 of the panel 54 for restrained sliding movement. The guide track 116 generally prevents or restricts movement of the inner member 92 when the assembly 20 is moving between longitudinal positions 34, 36, and enables guided vertical movement of the roller actuator 72 when the assembly 20 is moving between tilt states 38, 40.

As best shown in FIG. 6 and because members 92, 94 are preferably identical, outer member 94 also has ribs 120, 122. However, ribs 120, 122 of member 94 are not part of feature 116 and thus do not perform a function. One skilled in the art would now realize that members 92, 94 may not be identical. If not identical, outer member 94 may be manufactured without ribs 120, 122. Furthermore, the bore 112 of outer member 94 could be threaded for a locking engagement to the threaded end 78 of carrier 74.

As best shown in FIGS. 6-8, guide feature 118 maintains substantial linear movement of the lever 86 along centerline 90 while permitting slight lateral movement of the lever 86 away from inner member 92 and along centerline 76 when locking the device 66. For sliding contact with opposite longitudinal edges 126, 128 of end portion 96 of lever 86, feature 118 has first and second projections 130, 132 projecting outward from the base portion 114 of each member 92, 94. With respect to base portion 114 the projections 130, 132 are preferably kitty-corner to one another and project axially with respect to centerline 76 and in a direction opposite to the lateral projections of the ribs 120, 122 attached to the respective members 92, 94.

For structural support and respective sliding contact with the axial projections 130, 132 of one member, the feature 118 has respective first and second stanchions 134, 136 projecting radially outward in substantially opposite directions from the base portion 114 of the other member (with respect to centerline 76). When assembled, the projection 130 contiguous to inner member 92 is in sliding contact with stanchion 134 contiguous to outer member 94, and the projection 132 contiguous to inner member 92 is in sliding contact with stanchion 136 contiguous to outer member 94. Similarly, the projection 130 contiguous to outer member 94 is in sliding contact with stanchion 134 contiguous to inner member 92, and the projection 132 contiguous to outer member 94 is in sliding contact with stanchion 136 contiguous to inner member 92. The projections 130, 132 and stanchions 134, 136 of the guide feature 118 enable sliding of the outer member 94 along the centerline 76 and with respect to lever 86, while simultaneously enabling lateral sliding of the lever 86 along the centerline 76 with respect to member 92 and as the device 66 moves between the locked and unlocked positions 82, 84.

For an even or symmetric distribution of camming forces during actuation of device 66, the inward cam couplers 100, 102 are generally positioned diametrically opposite with respect to one another (i.e. positioned one-hundred and eighty degrees apart from one-another) and with respect to the carrier centerline 76. Preferably, coupler 100 is generally located radially outward from the carrier 74 and radially inward from feature 118. Likewise, coupler 102 is generally located radially outward from the carrier 74 and radially inward from feature 118. Couplers 104, 106 are diametrically positioned with respect to one another (i.e. positioned one-hundred and eighty degrees apart from one-another) and with respect to the carrier centerline 76. Preferably, coupler 104 is generally located radially outward from the carrier 74 and radially inward from feature 118. Likewise, coupler 106 is generally located radially outward from the carrier 74 and radially inward from feature 118.

The end portion 96 of lever 86 is preferably a flat bar and carries an inward side 146 being of both couplers 100, 102, and an outward side 148 being of both couplers 104, 106. The opposite sides 146, 148 flank the edges 126, 128 of the end portion 96, and the slot 110 communicates through both sides 146, 148. Generally, the inward side 146 faces the inward member 92 and the outward side 148 faces the outward member 94. The edges 126, 128 and the sides 146, 148 are substantially parallel to one-another and to the centerline 90. Each coupler 100, 102, 104, 106 has a roller or preferably a rolling pin 150 disposed substantially in respective tapered recesses 152, 154 of both members 92, 94. Each recess 152, 154 is defined in-part by a bottom surface 156 carried by the base portion 114 and each lying in respective imaginary planes that intersect both centerline 76 and centerline 90.

Each bottom surface 156 spans between substantially vertical and opposing faces 158, 160 that define in-part each recess 152, 154. With respect to the vehicle, face 158 faces forward and defines a rearward end of the recess, and face 160 faces rearward and defines a forward end of the recess. The forward face 158 is preferably wider than the rearward face 160 due to the tapering effect of the bottom surface 156 and by an amount generally equal to half the throw of the carrier 74 as it moves between locked and unlocked positions 82, 84. Preferably, the width of forward face 158 is substantially equal to the diameter of the rolling pin 150. Generally, each recess 152, 154 gets deeper in the forward direction with respect to the vehicle. Preferably, the bottom surface 156 of the first coupler 100 is parallel to the bottom surface 156 of the second coupler 102. Similarly, the bottom surface 156 of the third coupler 104 is parallel to the bottom surface 156 of the fourth coupler 106. The imaginary planes of the bottom surfaces 156 of the first and second couplers 100, 102 intersect the imaginary planes of the bottom surfaces 156 of the third and fourth couplers 104, 106 along intersecting lines (not shown) that are generally parallel to rolling axes 163 of each rolling pin 150. The rolling axes 163 are substantially perpendicular to centerlines 76, 90 and parallel to respective surfaces 156.

As previously described and in reference to FIGS. 5 and 6, the springs 91 of the indexing apparatuses 68, 70 are orientated to bias the locking device 66 toward the unlocked position 84. To resist this biasing force when the device 66 is in the locked position 82, the end portion 96 of the lever 86 preferably carries a detent or cantilevered tab 164 that resiliently projects flexibly into the slot 110 near a forward facing stop face 166 that generally defines a rearward end of the slot 110 with respect to the vehicle. Similarly, the end portion 96 may also have a second detent or cantilevered tab 168 located near a rearward facing stop face 170 that generally defines a forward end of the slot 110.

As previously described in-part and best shown in FIGS. 7 and 8, one rolling pin 150 is located in each recess 152, 154 in each member 92, 94 for reducing friction between the lever sides 146, 148 and the bottom surfaces 156 of the respective members 92, 94, and for generally restricting and diverting motion along the centerline 90 to motion along the centerline 76. When the actuator 72 is in the locked position 82 (see FIG. 8), the rolling pins 150 are at the forward end of each respective recess 152, 154 and near or against the rearward face 160, and the carrier 74 is snap fitted directly between the flexible lock tab 164 and stop face 166 of the lever 86. When the actuator 72 is in the unlocked position 84 (see FIG. 7), the rolling pins 150 are at the rearward end of each respective recess 152, 154 of each member 92, 94 and near or against the forward face 158, and the carrier 74 (in addition to the biasing spring force) may be snap fitted directly between the flexible tab 162 and near or against the stop face 170 of the lever 86.

During operation of the lock device 66, the indexing apparatuses 68, 70 are simultaneously placed in the unlocked position 84 (as best shown in FIG. 7) when the driver desires to longitudinally and/or tiltably adjust the steering housing 28. The lock device 66 is placed in the locked position 82 (as best shown in FIG. 8) after the driver has selected a desirable longitudinal position and tilt state for the steering wheel. In order to move the device 66 between the unlocked and locked positions 84, 82, the driver respectively pulls and preferably pushes upon the lever 86 of the actuator 72 in a linear direction or along centerline 90.

When the lever 86 of the roller pin actuator 72 of the lock device 66 is pulled by the driver to unlock (i.e. rearward toward the driver), the outward cam member 94 moves along centerline 76 and toward the side 148 of the lever 86. With continued pulling of the lever 86 and with the biasing assistance of the springs 91 of the respective indexing apparatuses 68, 70, the device 66 is preferably placed in the unlocked position 84 generally designated when the carrier 74 snap fits past the flexible tab 162 and abuts the stop face 170 of the lever 86.

During this pulling action, the rolling pins 150 generally roll about respective axes 163 and from the rearward face 160 and toward the wider forward face 158 defining each recess 152, 154 of each member 92, 94. The throw of the lever 86 along centerline 90 and the shifting of the rolling pins 150 in the recesses 152, 154 cause the outer member 94 with the carrier 74 to move along the centerline 76 by a throw, which is great enough to release the indexing apparatuses 68, 70.

This throw is substantially equal to the difference of the widths between the forward and rearward faces 158, 160.

When the desired longitudinal position and tilt state of the assembly 20 is selected, the lever 86 of the actuator 72 is pushed by the driver to lock (i.e. forward and away from the driver) and against the biasing force of the springs 91 and resistance of the tab 162. Continued pushing in the forward direction with respect to the vehicle causes an opposite motion of the rollers as previously explained when unlocking. This action moves the members 92, 94 away from one another and away from respective inner and outer sides 146, 148 of the lever 86 and until the carrier 74 snap locks past the resilient tab 164 and abuts the stop face 166. Once in the locked position 82, the tab 164 resists the biasing force of the springs 91, thus maintaining the device 66 in the locked state.

Figure 11:
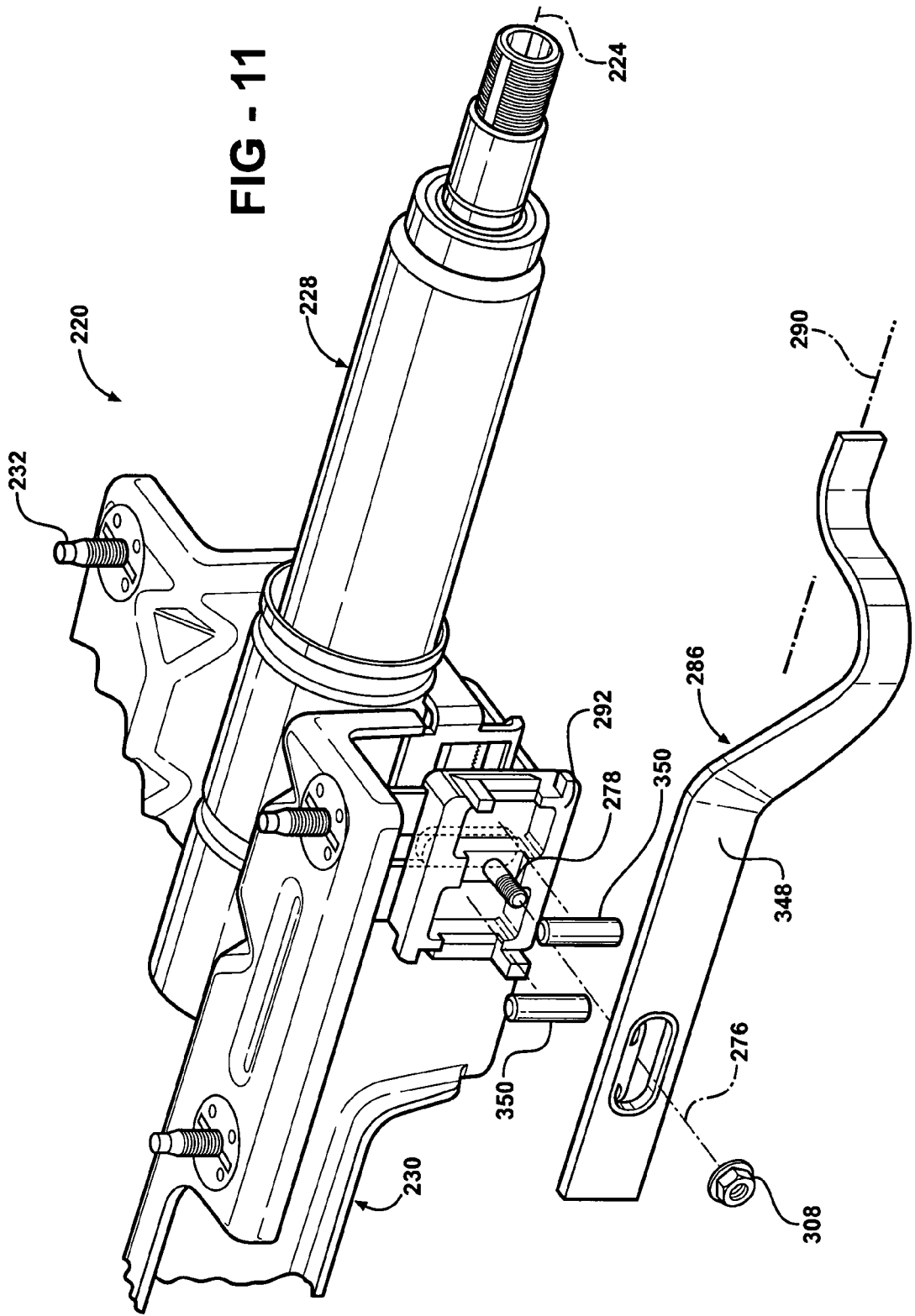
FIG. 11 is an exploded perspective view of a second embodiment of a roller actuator of a central lock device.
Figure 12:
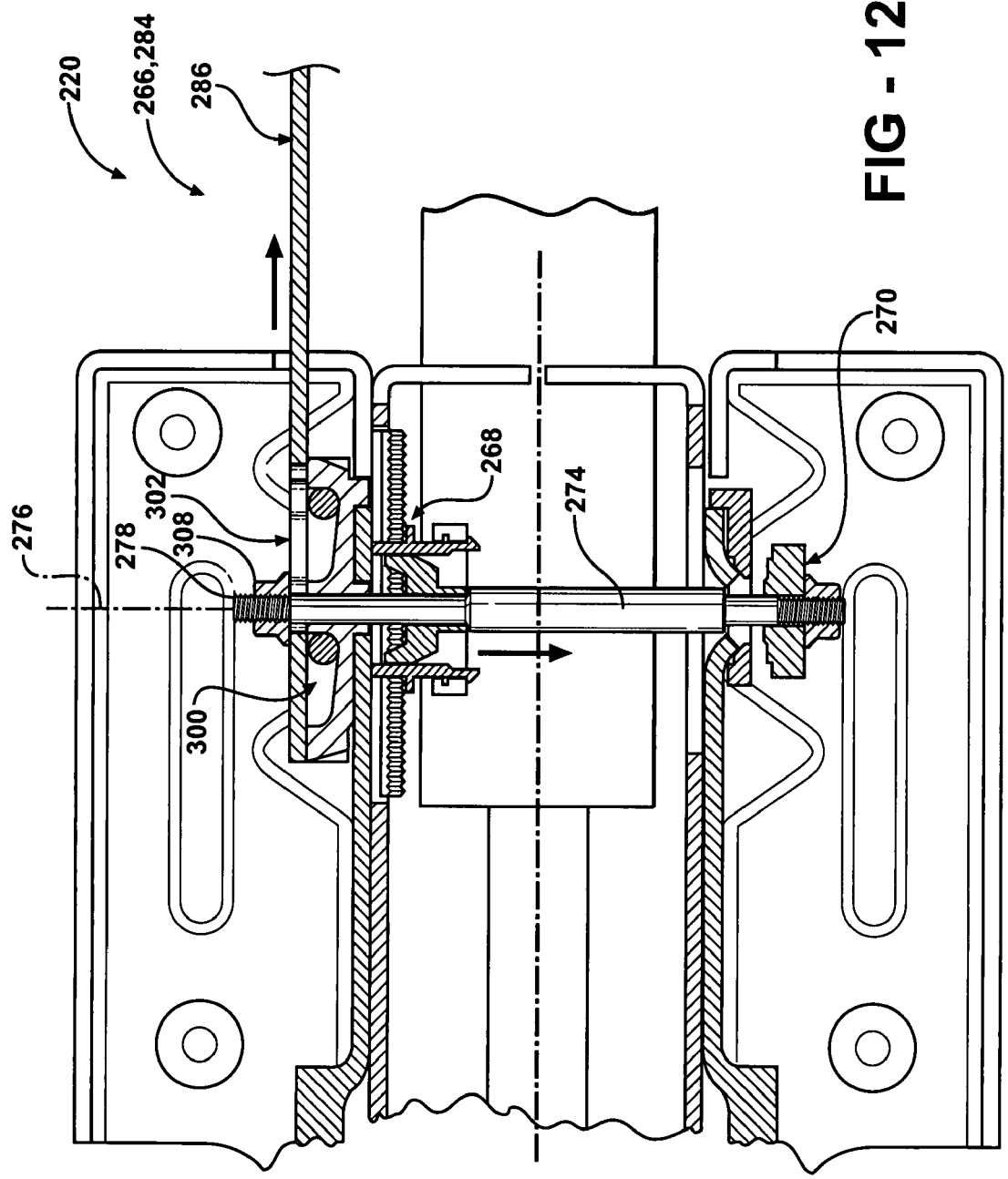
FIG. 12 is a cross section of the central lock device of FIG. 11 illustrated in an unlocked position.
Figure 13:
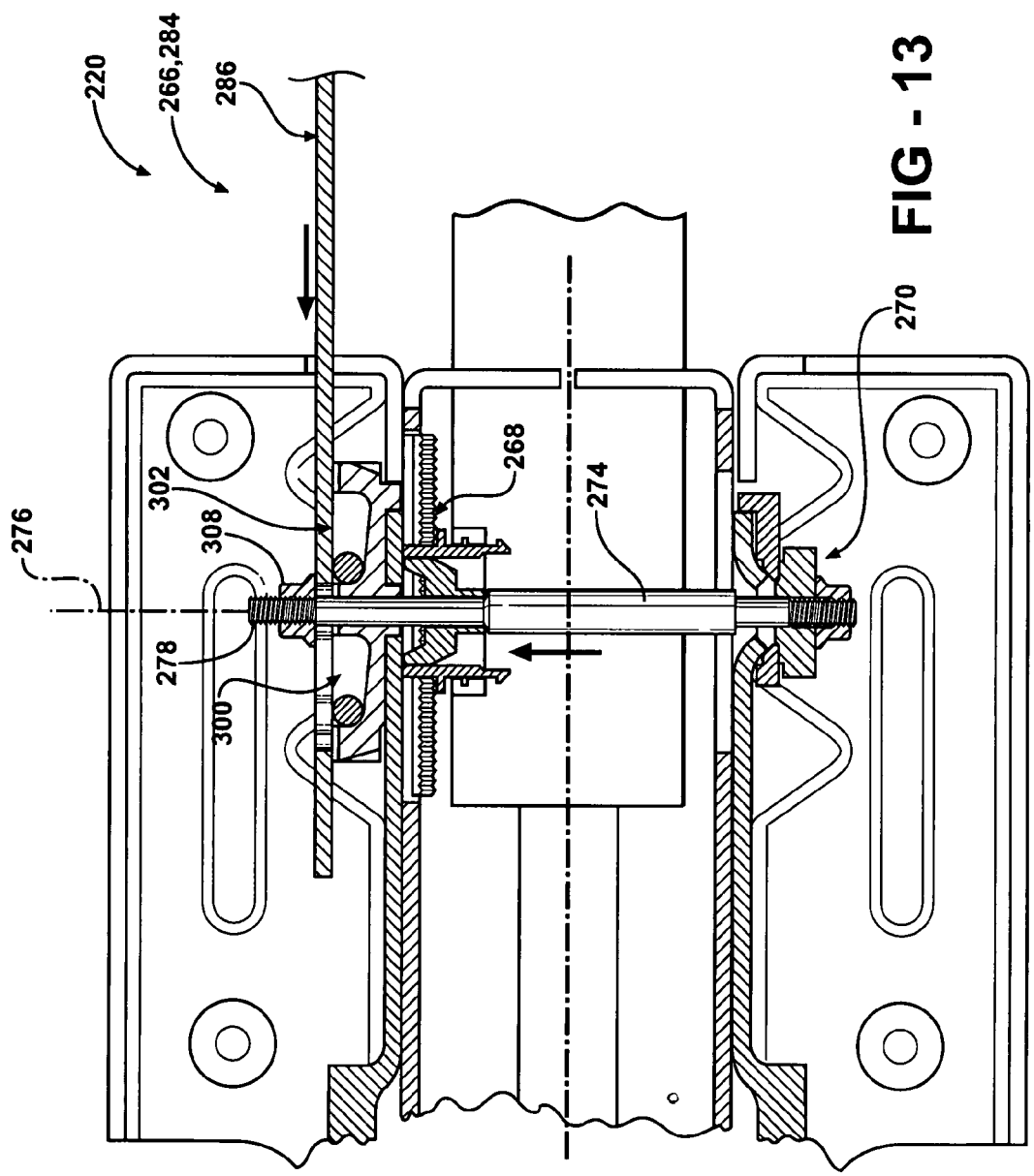
FIG. 13 is a cross section of the central lock device similar in perspective to FIG. 12 except illustrated in a locked position.

Referring to FIGS. 11-13, a second embodiment of a central lock device 266 is illustrated wherein like elements to the first embodiment have the same identifying numerals except with the summed addition of two hundred. Unlike device 66, device 266 does not have an outer member, and thus has only two couplings 300, 302 and not four. For lock device 266, a threaded nut or enlarged head 308 engages a threaded end 278 of a carrier 274. The nut 308 slides directly against an outer surface 348 of a lever 286 as the device moves between unlocked and locked positions 284, 282.

Figure 14:
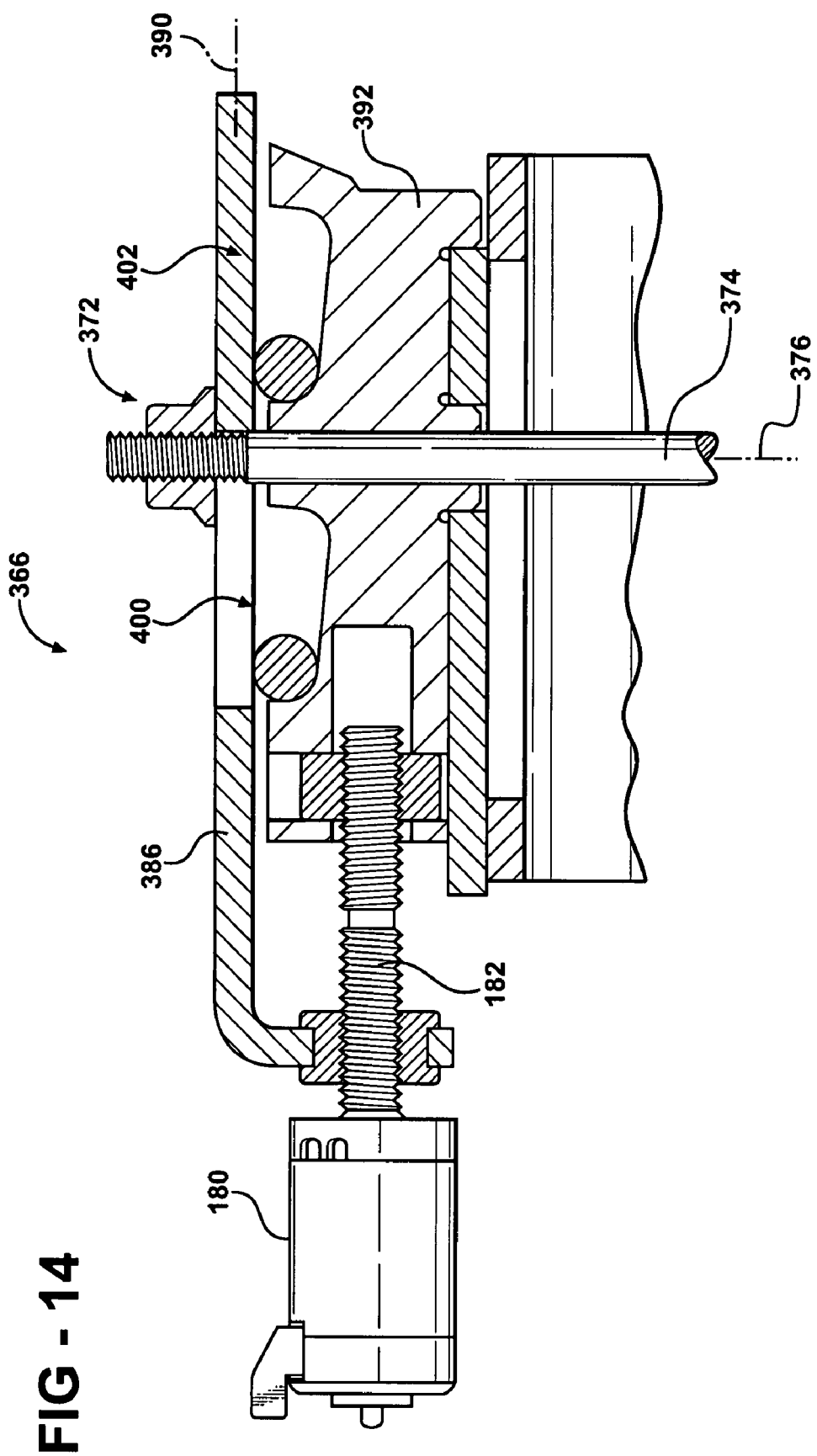
FIG. 14 is a partial cross section of a third embodiment of a central lock device.

Referring to FIG. 14, a third embodiment of a central lock device 366 is illustrated wherein like elements to the first embodiment have the same identifying numerals except with the summed addition of three hundred. Unlike devices 66, 266 that are generally manual, device 366 has a reversible electric motor 180 with a motor housing engaged rigidly to a steering column housing (not shown) of the vehicle. The motor 180 has a rotating shaft or turn buckle 182 that extends substantially parallel to a steering column or a rotation axis of a steering shaft (not shown). A lever 386 of the device 366 is threaded to the shaft 182 forming a screw drive arrangement for movement of the lever 286 between locked and unlocked positions along a centerline or direction 390 causing an actuator 372 to move a carrier 374 along a centerline 376 that is substantially perpendicular to centerline 390.

While the forms of the invention herein disclosed constitute presently preferred embodiments, many others are possible. It is not intended herein to mention all the possible equivalent forms or ramifications of the invention. It is understood that terms used herein are merely descriptive, rather than limiting, and that various changes may be made without departing from the spirit or scope of the invention.

The invention claimed is:

1. An adjustable steering column assembly for a vehicle comprising:
    a bracket;
    a housing supported adjustably by and movable with respect to said bracket;
    a steering shaft journaled to said housing for rotation about a steering axis;
    a member supported at least in-part by said bracket;
    a nonpivoting lever cammed to said member and having rectilinear movement substantially along a first centerline, wherein movement of said lever along said first centerline causes said carrier to move along said second centerline and between locked and unlocked positions;
    a carrier engaged slidably to said lever for movement along a second centerline that traverses said first centerline; and
    a first indexing apparatus carried between said carrier and said housing for longitudinal adjustment of the steering column assembly.

2. An adjustable steering column assembly for a vehicle comprising:
a bracket;
a housing supported adjustably by and movable with respect to said bracket;
a steering shaft journaled to said housing for rotation about a steering axis;
a member supported at least in-part by said bracket;
a lever cammed to said member and constructed and arranged to move substantially along a first centerline;
a carrier engaged slidably to said lever for movement along a second centerline that traverses said first centerline;
a first indexing apparatus carried between said carrier and said housing for longitudinal adjustment of the steering column assembly; and
a cam coupler having a planar surface carried by said member and a planar side carried by said lever and opposing said planar surface;
wherein movement of said lever along said first centerline causes said carrier to move along said second centerline and between locked and unlocked positions, and at least one of said planar side and said planar surface lie in an imaginary plane that traverses both said first and second centerlines.

3. The adjustable steering column assembly set forth in claim 2 further comprising a rolling pin of said cam coupler being in rolling contact between said inward side and said outward surface and having a rolling axis orientated perpendicular to the first and second centerlines.

4. The adjustable steering column assembly set forth in claim 3 further comprising a spring supported compressible between said housing and said first indexing apparatus for biasing said carrier toward said unlocked position.

5. The adjustable steering column assembly set forth in claim 4 further comprising a second indexing apparatus carried between said bracket and said carrier for tilt adjustment of the adjustable steering column assembly.

6. The adjustable steering column assembly set forth in claim 5 wherein the member is supported slidably by the bracket for movement in a substantially vertical direction during tilt adjustment.

7. The adjustable steering column assembly set forth in claim 6 further comprising:
said member being an inward member;
said cam coupler being an inward cam coupler;
an outward member fixed to said carrier; and
an outward cam coupler carried between said outward member and said lever.

8. A central lock device for an adjustable steering column assembly of a vehicle having a steering shaft rotatable about an axis and a co-extending housing journaled to the shaft and engaged operably to a bracket, the central lock device comprising:
a member;
a carrier constructed and arranged for biased movement with respect to said member and along a first centerline traverse to the axis and between a locked position and an unlocked position;
a nonpivoting lever connected slidably to the carrier and having rectilinear movement substantially along a second centerline that traverses said first centerline for moving the carrier between said locked and unlocked positions; and
a cam coupler having a bottom surface carried by said member, an opposing side carried by said lever, and a roller located rotatably between said bottom surface and said side for converting movement of said lever along said second centerline to movement of said carrier along said first centerline.

9. The central lock device set forth in claim 8 wherein said roller is a rolling pin having an axis disposed perpendicular to said first and second centerlines.

10. The central lock device set forth in claim 8 wherein said side is parallel to said second centerline.

11. The central lock device set forth in claim 8 further comprising an indexing apparatus carried in-part by said carrier and having a spring for biasing said lock device toward said unlocked position.

12. The central lock device set forth in claim 8 wherein said bottom surface defines in-part a recess in said member.

13. The central lock device set forth in claim 8 wherein said first centerline intersects said second centerline.

14. A central lock device for an adjustable steering column assembly of a vehicle having a steering shaft rotatable about an axis and a co-extending housing journaled to the shaft and engaged operably to a bracket, the central lock device comprising:
an inward member;
a carrier constructed and arranged for biased movement with respect to said inward member and along a first centerline traverse to the axis and between a locked position and an unlocked position;
a lever connected slidably to the carrier and constructed and arranged for movement substantially along a second centerline that traverses said first centerline for moving the carrier between said locked and unlocked positions;
an inward cam coupler having a bottom surface carried by said inward member, an opposing side carried by said lever, and a first roller located rotatably between said bottom surface and said side for converting movement of said lever along said second centerline to movement of said carrier along said first centerline;
an outward member constructed and arranged to move with said carrier;
wherein said lever is located between said inward and outward members;
an outward cam coupler having an inward surface carried by the outward member and an opposing outward side carried by said lever; and
a second roller located rotatably between said inward surface and outward side of said outward cam coupler for converting movement of said lever along said second centerline to movement of said carrier along said first centerline.

15. A central lock device for an adjustable steering column assembly of a vehicle having a steering shaft rotatable about an axis and a co-extending housing journaled to the shaft and engaged operably to a bracket, the central lock device comprising:
a member;
a carrier constructed and arranged for biased movement with respect to said member and along a first centerline traverse to the axis and between a locked position and an unlocked position;
a lever connected slidably to the carrier and constructed and arranged for movement substantially along a second centerline that traverses said first centerline for moving the carrier between said locked and unlocked positions; and
a first cam coupler having a bottom surface carried by said member, an opposing side carried by said lever, and a first rolling pin having an axis disposed perpendicular to said first and second centerlines and located rotatably between said bottom surface and said side for converting movement of said lever along said second centerline to movement of said carrier along said first centerline;

a second cam coupler carried between said member and said lever; and a second rolling pin associated with said second cam coupler.

16. The central lock device set forth in claim 15 wherein said axis of said first rolling pin is parallel to an axis of said second rolling pin.

17. The central lock device set forth in claim 15 wherein said second cam coupler has an bottom surface carried by said member and disposed parallel to said bottom surface of said first cam coupler.

18. The central lock device set forth in claim 17 wherein said second cam coupler has a side carried by said lever and opposing said bottom surface of said second cam coupler and being co-planar to said side of said first cam coupler.

19. A central lock device for an adjustable steering column assembly of a vehicle having a steering shaft rotatable about an axis and a co-extending housing journaled to the shaft and engaged operably to a bracket, the central lock device comprising:

an inward member;

a carrier constructed and arranged for biased movement with respect to said inward member and along a first centerline traverse to the axis and between a locked position and an unlocked position;

a lever connected slidably to the carrier and constructed and arranged for movement substantially along a second centerline that traverses said first centerline for moving the carrier between said locked and unlocked positions; and a first inward cam coupler having a bottom surface carried by said member, an opposing side carried by said lever, and a first roller located rotatably between said bottom surface and said side for converting movement of said lever along said second centerline to movement of said carrier along said first centerline;

a second inward cam coupler located diametrically opposite to said first inward cam coupler with respect to said first centerline;

a second roller of said second inward cam coupler;

an outward member fixed to said carrier;

wherein said lever is located between said inward and outward members;

first and second outward cam couplers carried between said outward member and said lever;

third and fourth rollers of said respective first and second outward cam couplers; and wherein said first outward cam coupler is located diametrically opposite to said second outward cam coupler with respect to said first centerline.

20. A central lock device for an adjustable steering column assembly of a vehicle having a steering shaft rotatable about an axis and a co-extending housing journaled to the shaft and engaged operably to a bracket, the central lock device comprising:

a member;

a carrier constructed and arranged for biased movement with respect to said member and along a first centerline traverse to the axis and between a locked position and an unlocked position;

a lever connected slidably to the carrier and constructed and arranged for movement substantially along a second centerline that traverses said first centerline for moving the carrier between said locked and unlocked positions; and a cam coupler having a bottom surface carried by said member, an opposing side parallel to said second centerline and carried by said lever, and a roller located rotatably between said bottom surface and said side for converting movement of said lever along said second centerline to movement of said carrier along said first centerline;

wherein said bottom surface is planar and lies in an imaginary plane that traverses said first and second centerlines.

* * * * *